United States Patent
Hey et al.

(10) Patent No.: US 10,025,446 B2
(45) Date of Patent: *Jul. 17, 2018

(54) AUTOMATED SCREEN CAPTURES

(71) Applicant: International Business Machines Corporation, Armonk, NY (US)

(72) Inventors: Laurence A. Hey, Manly (AU); William J. Izard, Balmain (AU); Matthew J. Ponsford, Manly (AU)

(73) Assignee: International Business Machines Incorporated, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/034,638

(22) Filed: Sep. 24, 2013

(65) Prior Publication Data

US 2014/0181629 A1 Jun. 26, 2014

Related U.S. Application Data

(63) Continuation of application No. 13/724,295, filed on Dec. 21, 2012.

(51) Int. Cl.
*G06F 3/048* (2013.01)
*G06F 11/36* (2006.01)

(52) U.S. Cl.
CPC .......... *G06F 3/048* (2013.01); *G06F 11/3672* (2013.01)

(58) Field of Classification Search
CPC .. G06F 11/36; G06F 11/3668; G06F 11/3664; G06F 17/30905
USPC .......... 715/762–763; 717/124–135; 382/128; 385/128
See application file for complete search history.

(56) References Cited

U.S. PATENT DOCUMENTS

| | | | |
|---|---|---|---|
| 7,231,606 B2* | 6/2007 | Miller et al. | 715/738 |
| 7,346,850 B2 | 3/2008 | Swartz et al. | |
| 7,421,683 B2* | 9/2008 | Robertson | G06F 11/3696 714/E11.207 |
| 7,966,604 B2 | 6/2011 | Tomar | |
| 8,001,532 B1 | 8/2011 | Jakubiak et al. | |
| 8,239,831 B2 | 8/2012 | Brennan et al. | |
| 8,332,765 B2 | 12/2012 | Ergan et al. | |
| 8,549,395 B2* | 10/2013 | Graves | G06F 17/30905 715/234 |
| 8,793,578 B2 | 7/2014 | Mounty et al. | |

(Continued)

OTHER PUBLICATIONS

Sundberg, "Testing a web application with Selenium 2", as evidenced by Archive.org at https://thomassundberg.wordpress.com/2011/10/18/testingawebapplicationwithselenium2/, Oct. 18, 2011, pp. 1-25.*

(Continued)

*Primary Examiner* — Andrew Tank
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for automatically creating screen captures of a user interface. In an implementation, a method may include identifying a portion of a user interface display associated with a page object. The method may also include creating a screen capture image including the portion of the user interface display associated with the page object. The method may further include associating the screen capture image with a documentation record for the page object.

5 Claims, 5 Drawing Sheets

(56) References Cited

U.S. PATENT DOCUMENTS

| | | | |
|---|---|---|---|
| 8,929,667 B1 | 1/2015 | Yuhan et al. | |
| 8,996,988 B2* | 3/2015 | Yee | 715/235 |
| 2004/0037475 A1 | 2/2004 | Avinash et al. | |
| 2007/0015118 A1 | 1/2007 | Nickell et al. | |
| 2008/0134062 A1 | 6/2008 | Bauman et al. | |
| 2010/0064209 A1 | 3/2010 | Wielgosz et al. | |
| 2012/0144286 A1 | 6/2012 | Bank et al. | |
| 2012/0198362 A1 | 8/2012 | Urban et al. | |
| 2012/0243745 A1 | 9/2012 | Amintafreshi | |
| 2013/0254855 A1* | 9/2013 | Walters | G06F 21/60 726/5 |
| 2013/0287305 A1 | 10/2013 | Dhanda et al. | |
| 2014/0053061 A1 | 2/2014 | Chasen et al. | |
| 2014/0096114 A1 | 4/2014 | Koren et al. | |
| 2014/0136944 A1* | 5/2014 | Harris et al. | 715/234 |

OTHER PUBLICATIONS

Anders, "Is it possible to capture a screen shot for a webelement directly using WebDriver?", as evidenced by Archive.org https://web.archive.org/web/20120307001235/http://stackoverflow.com/questions/8642376/is-it-possible-to-capture-a-screen-shot-for-a-webelement-directly-by-using-webdr, Mar. 7, 2012, pp. 1-2.*

Burton et al., "org.apache.commons.io Class FileUtils", Jan. 10, 2008, https://commons.apache.org/proper/commons-io/javadocs/api-1.4/org/apache/commons/io/FileUtils.html, pp. 1-29.*

Clark et al., "XML Path Language (XPATH) Version 1.0", W3C Recommendation Nov. 16, 1999, as evidenced by Archive.org at http://www.w3.org/TR/xpath, Nov. 4, 2011 (pp. 1-22).

* cited by examiner

AUTOMATED SCREEN CAPTURES

RELATED APPLICATIONS

The subject application is a continuation application of U.S. patent application with Ser. No. 13/724,295, filed on Dec. 21, 2012, the entire content of which is herein incorporated by reference.

TECHNICAL FIELD

The present disclosure generally relates to systems and method for creating screen capture images of user interface features.

BACKGROUND

Software user interfaces, for example, user interfaces of browser-based software products, and the like, may often be tested using various automated testing tools. Such automated software testing tools may test the software product by interacting with the user interface. For example, the software testing tools may enter text into text input fields, click on links and buttons in the user interface, and similarly test various other aspects of the user interface. Such testing may be directed at ensuring that all of the included features of the user interface operate correctly. For example, when a button within a user interface is clicked by the testing tool, the testing tool may then evaluate the result of the interaction with the user interface. That is, did the software product perform the intended action or provided an appropriate result in response to the button being clicked. The automated nature of the testing may allow many and/or all of the features of a user interface to be tested to ensure proper operation, while at the same time reducing the time and manual labor that would be required to manually test and evaluate all of the features of the user interface.

SUMMARY OF DISCLOSURE

According to an implementation, a computer-implemented method may include identifying a portion of a user interface display associated with a page object. The method may also include creating a screen capture image including the portion of the user interface display associated with the page object. The method may also include associating the screen capture image with a documentation record for the page object.

One or more of the following features may be included. The method may include identifying a screen capture annotation associated with the page object. Creating the screen capture image may be in response to identifying the screen capture annotation. Identifying the portion of the user interface display associated with the page object may include identifying an explicitly defined parent element in a document object model associated with the page object. Identifying the portion of the user interface display associated with the page object may include calculating a parent element in a document object model associated with the page object.

The method may also include cropping the screen capture image to isolate the page object. Cropping the screen capture image may include extracting a user interface screen location associated with the page object. Associating the screen capture image with the documentation record for the page object may include replacing a prior screen capture image.

According to another implementation, a computer program product includes a computer readable medium having a plurality of instructions stored on it. When executed by a processor the instructions may cause a processor to perform operations including identifying a portion of a user interface display associated with a page object. Instructions may also be included for creating a screen capture image including the portion of the user interface display associated with the page object. Instructions may also be included for associating the screen capture image with a documentation record for the page object.

One or more of the following features may be included. Instructions may be included for identifying a screen capture annotation associated with the page object. Creating the screen capture image may be in response to identifying the screen capture annotation. The instructions for identifying the portion of the user interface display associated with the page object may include instructions for identifying an explicitly defined parent element in a document object model associated with the page object. The instructions for identifying the portion of the user interface display associated with the page object may include instructions for calculating a parent element in a document object model associated with the page object.

Instructions may also be included for cropping the screen capture image to isolate the page object. The instructions for cropping the screen capture image may include instructions for extracting a user interface screen location associated with the page object. The instructions for associating the screen capture image with the documentation record for the page object may include instructions for replacing a prior screen capture image.

According to another implementation, a computing system may include a processor device configured to identify a portion of a user interface display associated with a page object. The processor device may also be configured to create a screen capture image including the portion of the user interface display associated with the page object. The processor device may further be configured to associate the screen capture image with a documentation record for the page object.

One or more of the following features may be included. The processor device may be further configured to identify a screen capture annotation associated with the page object. Creating the screen capture image may be in response to identifying the screen capture annotation. The processor device configured to identify the portion of the user interface display associated with the page object may be configured to identify an explicitly defined parent element in a document object model associated with the page object. The processor device configured to identify the portion of the user interface display associated with the page object may be configured to calculate a parent element in a document object model associated with the page object.

The processor device may be further configured to crop the screen capture image to isolate the page object. The processor device configured to crop the screen capture image may be further configured to extract a user interface screen location associated with the page object. The processor device configured to associate the screen capture image with the documentation record for the page object may be further configured to replace a prior screen capture image.

The details of one or more implementations are set forth in the accompanying drawings and the description below.

Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
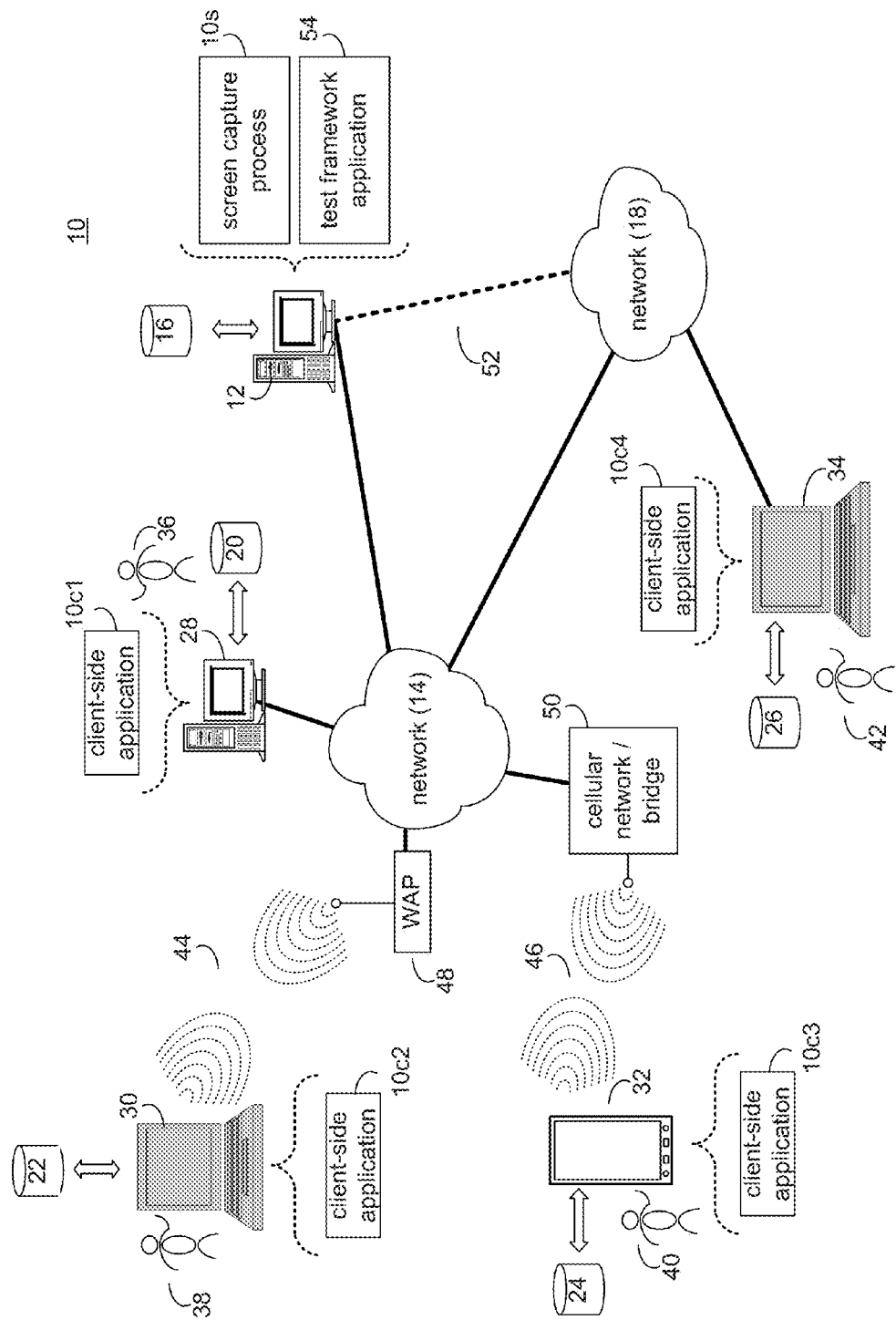
FIG. 1 is a diagrammatic view of a distributed computing network including a computing device that executes a screen capture process according to an implementation of the present disclosure.

Referring to FIG. 1, there is shown screen capture process 10. For the following discussion, it is intended to be understood that screen capture process 10 may be implemented in a variety of ways. For example, screen capture process 10 may be implemented as a server-side process, a client-side process, or a server-side/client-side process.

For example, screen capture process 10 may be implemented as a purely server-side process via screen capture process 10s. Alternatively, screen capture process 10 may be implemented as a purely client-side process via one or more of client-side application 10c1, client-side application 10c2, client-side application 10c3, and client-side application 10c4. Alternatively still, screen capture process 10 may be implemented as a server-side/client-side process via screen capture process 10s in combination with one or more of client-side application 10c1, client-side application 10c2, client-side application 10c3, and client-side application 10c4. In such an example, at least a portion of the functionality of screen capture process 10 may be performed by screen capture process 10s and at least a portion of the functionality of screen capture process 10 may be performed by one or more of client-side application 10c1, 10c2, 10c3, and 10c3.

Accordingly, screen capture process 10 as used in this disclosure may include any combination of screen capture process 10s, client-side application 10c1, client-side application 10c2, client-side application 10c3, and client-side application 10c4.

Figure 2:
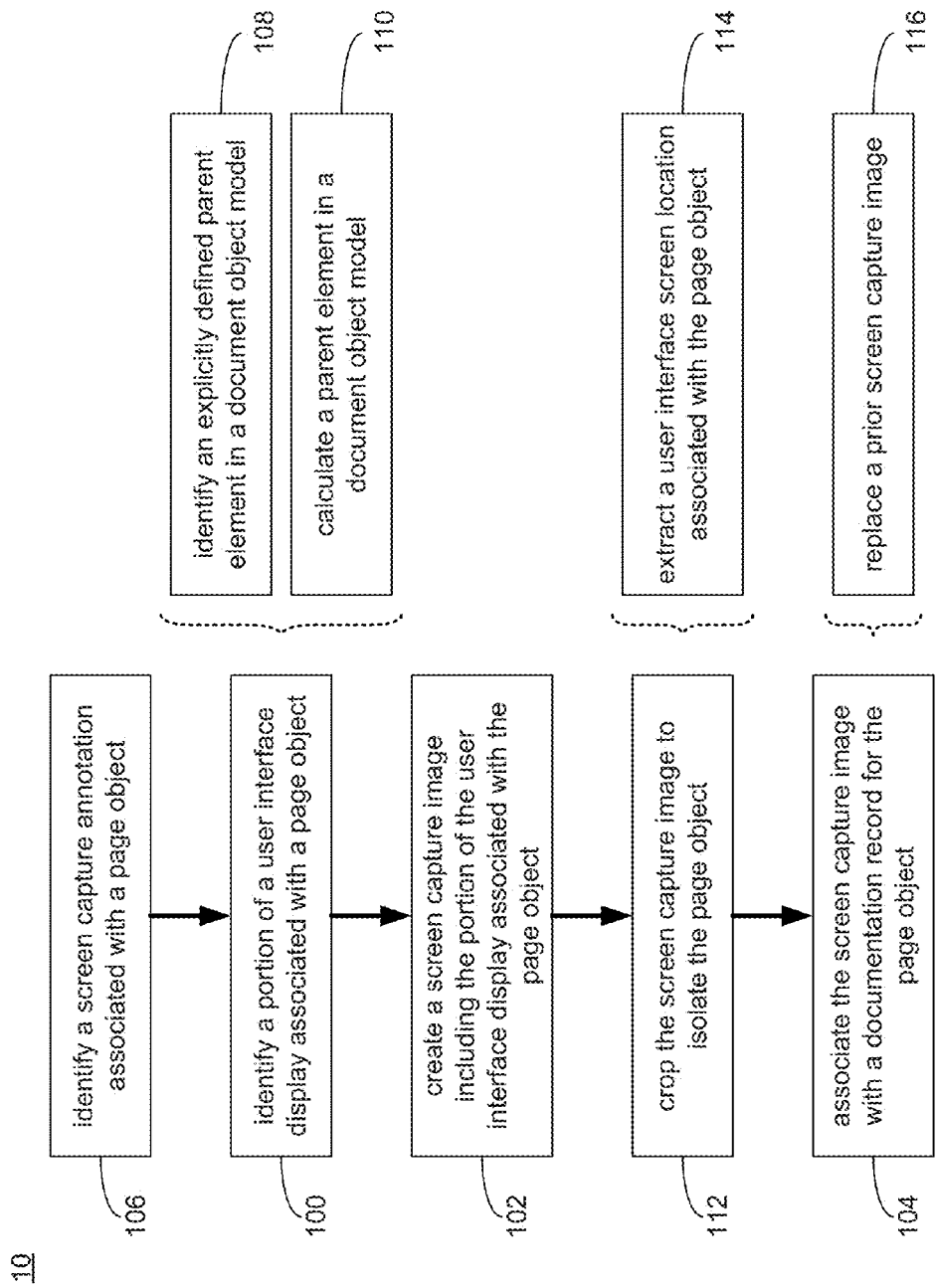
FIG. 2 is a flowchart of the screen capture process of FIG. 1, according to an implementation of the present disclosure.

Referring also to FIG. 2, and as will be discussed in greater detail below, screen capture process 10 may generally identify 100 a portion of a user interface display associated with a page object. Screen capture process 10 may also create 102 a screen capture image including the portion of the user interface display associated with the page object. Screen capture process 10 may further associate 104 the screen capture image with a documentation record for the page object.

Screen capture process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of screen capture process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to an automated software testing application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access screen capture process 10 directly through network 14 or through secondary network 18. Further, screen capture process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, screen capture process 10 may communicate with, interact with, and/or include a component or module of an automated software testing application (e.g., test framework application 54). In an embodiment, test framework application 54 (for example, Selenium browser automation framework, or other automated software testing application) may facilitate automated software testing, including, for example, testing web browser-based user interface and/or other (e.g., not web browser-based) user interface. For example, test framework application may allow authoring and execution of software tests, e.g., that may be run via test framework application 54, a client application (e.g., one or more of client applications 10c1-10c4, which may include web browsers and/or other suitable applications). One or more of users 36, 38, 40, 42 may access test framework application 54 via one or more respective client electronic devices (e.g., client electronic devices 28, 30, 32, 34) to author and/or execute a software test, e.g., of a user interface, etc.

In some embodiments, screen capture process 10 may generally allow images of select portions of a user interface display to be automatically captured and/or maintained, for example, as by automatically providing an updated screen capture image of the select portions of the user interface display in a situation in which the select portion of the user interface display has changed since the screen capture image was created. In some embodiments, the screen capture image including the select portion of the user interface display may be made available to an individual, e.g., who may use the image in connection with designing and/or authoring a test that may be executed relative to the user interface.

For example, a user interface of a software product may include one, or often many, different elements that may be presented to a user (e.g., in the form of a user interface display that may be presented to the user via an appropriate display device). The user may interact with various elements of the user interface for the purpose of operating the software product and/or utilizing functionality provided by the software product. For example, and referring also to FIG. 3, there is shown example user interface display 150 that may be generated by a software product. User interface display 150 may include a plurality of elements that may be graphically displayed to a user (e.g., user 36) by the software product in a particular state of the software product. As shown, user interface display 150 may include various elements that user 36 may interact with for the purpose of utilizing the software product. The various elements may include, for example, information that may be presented to user 36 (e.g., text, graphics, etc.), links that may be selected by user 36 (e.g., for navigating to various locations within the software product and/or external to the software product, for displaying information, etc.) buttons (or the like) that may be selected by user to cause the software product to perform various operations and/or provide various functionality. For example, in the illustrated example, user interface display 150 may generally include top menu 152 (e.g., which may include various elements), side bar 154 (e.g., which may include various elements) and login 156 (e.g., which may include various elements, such as login dialog 158, username field identifier 160, username text entry box 162, password field identifier 164, password text entry box 166, and sign in button 168). It will be appreciated that various different software product may include user interfaces including a wide variety of elements, combinations of elements, and graphical arrangements. In some embodiments, user interface display 150 may be a user interface associated with a web browser-based software product. As such, user interface display 150 may include a web browser display. In other embodiments, the user interface display may be associated with a non-web browser based software product and may, therefore, be a non-web browser based user interface.

When building (e.g., designing and/or authoring) an automated test for a user interface (e.g., which may include user interface display 150, for example), a user interface display may be logically considered to be a group of page objects. That is, for example, in such automated testing, a common pattern may be to utilize an object to encapsulate a particular page in a user interface, or a part of a page in a user interface, as a page object. The page object may provide an abstraction of the fields, such as button and text fields, and also the actions that can be performed on the fields, such as clickButton( ), enterText("myText")." Therefore, in general, a page object may include an object in an object oriented language (such as Java, or the like) that encapsulates part of the user interface display in a particular state. (Java is a trademark of Oracle Corporation in the United States, other countries, or both.) For example, in user interface display 150 login 156 may be a page object that encapsulates login dialog 158, username field identifier 160, username text entry box 162, password field identifier 164, password text entry box 166, and sign in button 168. As will be appreciated, in testing user interface display 150, login page object 156 (e.g., including the various elements thereof) may be used in various test scenarios, for example, as all of the elements generally relate to the same functionality (e.g., the ability to login via the software product).

As described, user interfaces in general, and page object in particular, may be very visual in nature, for example, in as much as users may interact with graphically displayed features of the user interface and page objects to utilize the software product and/or execute functionality provided by, or in connection with, the software product. For example, the page objects associated with the user interface may form part of the application programming interface (API) that may be, at least in part, the basis of the tests performed by the testing framework application. Accordingly, in order to build a test for the software product it may be useful for a tester (e.g., a user building the test) to have a clear understanding of the graphical elements included within the page object so that the tester may write tests using the page object API. According to an embodiment, screen capture process 10 may automatically capture an image of a page object as it may be displayed in a user interface. As such, when designing a test that implements an API associated with the page object, the tester may be able to visually reference the image of the page object. Further, in some embodiments, screen capture process 10 may also maintain the image of the page object, e.g., which may include capturing a new image of the page object in the event that the user interface changes.

As generally discussed above, screen capture process 10 may identify 100 a portion of a user interface display associated with a page object. Screen capture process 10 may also include create 102 a screen capture image including the portion of the user interface display associated with the page object. Screen capture process 10 may further associate 104 the screen capture image with a documentation record for the page object.

For example, screen capture process 10 may identify 100 a portion of a user interface display associated with a page object. Generally, identifying 100 a portion of the user interface display associated with the page object may include identifying which portion of the user interface display it is that the page object encapsulates. Referring to the example shown in FIG. 3, the page object may include login page object 156 included within user interface display 150 (e.g., which may be a currently displayed user interface state). In such an embodiment, login page object 156 may generally encapsulate login dialog 158, username field identifier 160, username text entry box 162, password field identifier 164, password text entry box 166, and sign in button 168 (as generally designated by the broken line box in FIG. 3).

In an embodiment, screen capture process 10 may identify the portion of the user interface display associated with the page object in response to identifying 106 a screen capture annotation associated with the page object. For example, during development of the software product (and/or at sometime thereafter) the developer of the software product (and/or another individual) may add an annotation to the software code associated with the page object that may indicate a request that a screen capture image of the page object (with which the annotation is associated) be taken and/or maintained. For example, for a software product written in Java, an example annotation may include:

@AUTOGENERATEJAVADOCSCREENCAPTURE
public class Login extends PageObject

In one such embodiment, the annotation may be defined as follows:

```
/**
* Mark a class with this annotation to take a screen capture of the page
object and insert it
* into the javadoc.
*/
@Retention (RetentionPolicy.RUNTIME )
@Target (ElementType.TYPE )
public @interface AUTOGENERATEJAVADOCSCREENCAPTURE {
    // no properties
}
```

In an example embodiment, when a test is run that tests user interface display 150 including login page object 156, the test (e.g., which may be carried out via test framework application 56) may acquire all page objects included within user interface display 150. When test framework application 56 acquires the page objects included within user interface display 150, screen capture process 10 may examine the various page objects from the presence of the annotation (e.g., the annotation "@AUTOGENERATEJAVADOC-SCREENCAPTURE" in the above example). In an embodiment in which the annotation is included associated with a page object (e.g., associated with login page object 156 in the example embodiment), screen capture process 10 may identify 106 the screen capture annotation associated with login page object 156. In response, at least in part, to identifying 106 the screen capture annotation, screen capture process 10 may identify 100 the portion of user interface display 150 associated with login page object 156, and may create 104 a screen capture image including the portion of user interface display 150 associated with login page object 156.

As discussed above, screen capture process 10 may identify a portion of a user interface display associated with a page object, which may, for example, include identifying which portion of the user interface display it is that the page object encapsulates. In various embodiments, the scope of a page object may be either explicitly defined or implicitly defined. The scope of the page object may define the parent element in a Document Object Model (DOM) structure that defines the outer bounds of the user interface that the page object represents. According to an embodiment, identifying 100 the portion of the user interface display associated with the page object may include identifying 108 an explicitly defined parent element in a document object model associated with the page object. For example, in some embodiments the page object (e.g., login page object 156) may explicitly define the scope of the page object. For example, the scope may be explicitly defined using a declaration in XPath or CSS, or other technologies that may be utilized for defining a DOM element. For example, the scope may include an HTML <div> element, which may contain all of the HTML markup for the login dialog included in login page object 156. In Selenium (as an example of test framework application 56), a scope may be defined as a org.openqa.selenium.WebElement object.

In an embodiment in which the scope of the page object is not explicitly defined, identifying 100 the portion of the user interface display associated with the page object may include calculating 110 a parent element in a Document Object Model associated with the page object. For example, calculating 110 the parent element in the DOM associated with the page object may include calculating 110 a lowest identified parent DOM element of defined elements of the page object. For example, login page object 156 may include login dialog 158, username field identifier 160, username text entry box 162, password field identifier 164, password text entry box 166, and sign in button 168. Screen capture process 10 may calculate 110 the scope of login page object 156 as the deepest element that is a parent to all of login dialog 158, username field identifier 160, username text entry box 162, password field identifier 164, password text entry box 166, and sign in button 168. Since the DOM may generally include a tree structure, the parent may be uniquely defined, and may be calculated 110 using the DOM API. For example, screen capture process 10 may calculate 110 the parent element using JavaScript and JQuery (e.g., a commonly used JavaScript library). Continuing with the above example of login page object 156, example code of calculating 110 the parent element may include:

```
function findCommonParent (elementA, elementB) {
    var commonParent = $(elementA).parents( ).has(elementB).first( );
    var commonParentId = commonParent.id;
    return commonParentId;
}
```

Suppose element1 is login dialog 158, element2 is username field identifier 160, element3 is username text entry box 162, element4 is password field identifier 164, element5 is password text entry box 166, and element6 is sign in button 168. Then the common parent element of all of these elements may be calculated by repeatedly using the method findCommonParent( ) for each pair of elements, for example:

```
var commonParentIdForAllElements = findCommonParent(element1,
findCommonParent(element2, findCommonParent(element3,
findCommonParent (element4, findCommonParent(element5,
element6))))
```

In an example in which test framework application 56 may include Selenium, the calculated parentId may be converted into a Selenium WebElement using the code:

```
Org.openqa.selenium.WebElement scope =
    Driver.findElement(By.id(commonParentId))
```

Screen capture process 10 may also include create 102 a screen capture image including the portion of the user interface display associated with the page object. In an example embodiment, screen capture process 10 may create 102 the screen capture image (e.g., in an example in which test framework application 56 includes Selenium) using the following Selenium API:

```
org.openqa.selenium.TakesScreenshot driver = getDriver( );
java.io.File screenCaptureFile = driver.getScreenshotAs
   (outputType.FILE );
```

Utilizing such an example API, screen capture process 10 may create a screen capture image including the portion of the user interface display associated with the page object.

Figure 3:
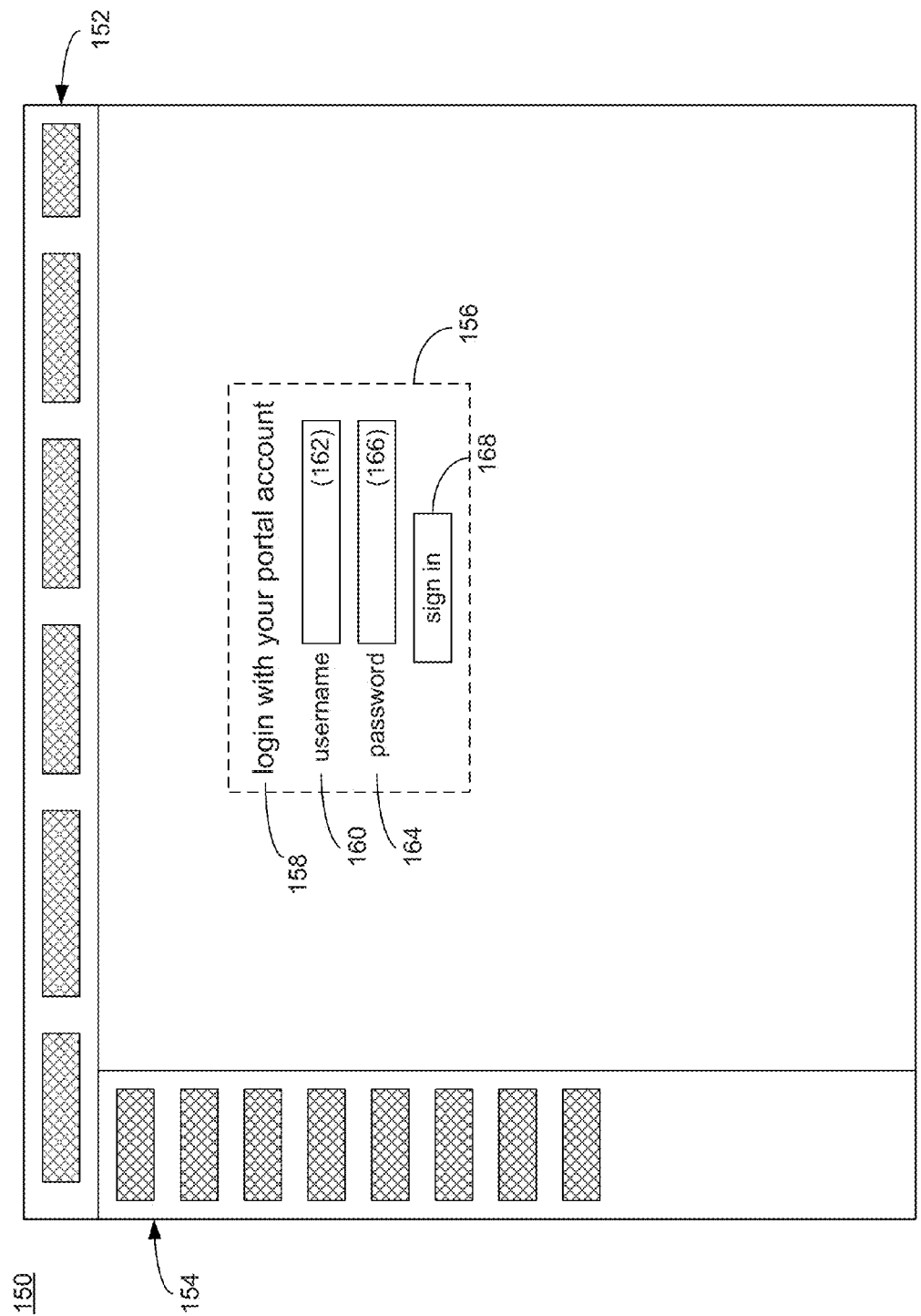
FIG. 3 is diagrammatic representation of an example user interface that may be utilized in connection with the screen capture process of FIG. 1, according to an implementation of the present disclosure.

In some implementations, it may be desirable to isolate only the portion of the user interface display including the page object (e.g., login page object 156 shown encompassed in broken line in FIG. 3). In such an embodiment, screen shot process 10 may, for example, crop 112 the screen capture image to isolate the page object. In an embodiment, cropping 112 the screen capture image may include extracting 114 a user interface screen location associated with the page object. In an embodiment, screen capture process 10 may extract 114 the user interface screen location associated with the page object prior to creating 102 the screen capture image. In an example embodiment, extracting 114 the user interface screen location may include using the DOM API to extract the screen location associated with the page object DOM element (i.e., the scope of the page object). For example, in an embodiment in which test framework application 56 includes Selenium, extracting 114 the user interface screen location may be achieved using the following code:

Scope.getLocation( )

In an embodiment, the extracted 114 user interface screen location associated with the page object may include the x and y coordinates and the width and height of the page object. Screen capture process 10 may crop 112 the screen capture image to include the portion of the user interface display identified as the location of the page object. In an embodiment, screen capture process 10 may crop 112 the screen capture image using the AWT (i.e., abstract window toolkit) API using the following code:

```
java.awt.image.BufferImage screenCaptureImage = readImage
  (screenCaptureFile);
BufferImage croppedImage = screenCaptureImage.getSubimage (x, y,
  width, height);
```

Wherein x and y may include the extracted 114 x and y coordinates associated with the page object, and width and height may include the extracted 114 width and height associated with the page object.

Screen capture process 10 may further associate 104 the screen capture image with a documentation record for the page object. For example, screen capture process 10 may save the cropped screen capture image including the image of the page object to a file system, or other appropriate repository. Further, associating 104 the screen capture image with a documentation record for the page object may include associating saved screen capture image with a documentation record for the page object. For example, a documentation record may include information (e.g., explanations and/or descriptions regarding portions of the software product) associated with a software product (e.g., which may include comments written in a language such as JavaDoc, and which may be included with the code of the software product). Screen capture process 10 may, for example, automatically associate 104 the screen capture image with the documentation record for the page object (e.g., with a portion of the code for the software product for the page object), and/or a user may manually associated the screen capture image with the documentation record.

In an embodiment, screen capture process 10 may automatically associate 104 the screen capture image with a documentation record for the page object, via an integrated development environment (IDE) plugin. In an embodiment in which the screen capture image may be stored to file system, an example of associating 104 the screen capture image with the documentation record may be:

```
/**
 * Represents the Login dialog.
 *
 * Here's what it looks like: <p><img src=login.png"/></p>
 */
public class Login extends PageObject
```

In a related manner, for a screen capture image stored in a repository, an example of associating 104 the screen capture image with the documentation record may include:

```
/**
*Represents the Login dialog.
*Here's what is looks like: <p><img src="
http://www.mycompany.com/PageObjectScreenCaptures/Login.png"/><p
>
*/
public class Login extends PageObject
```

Figure 4:
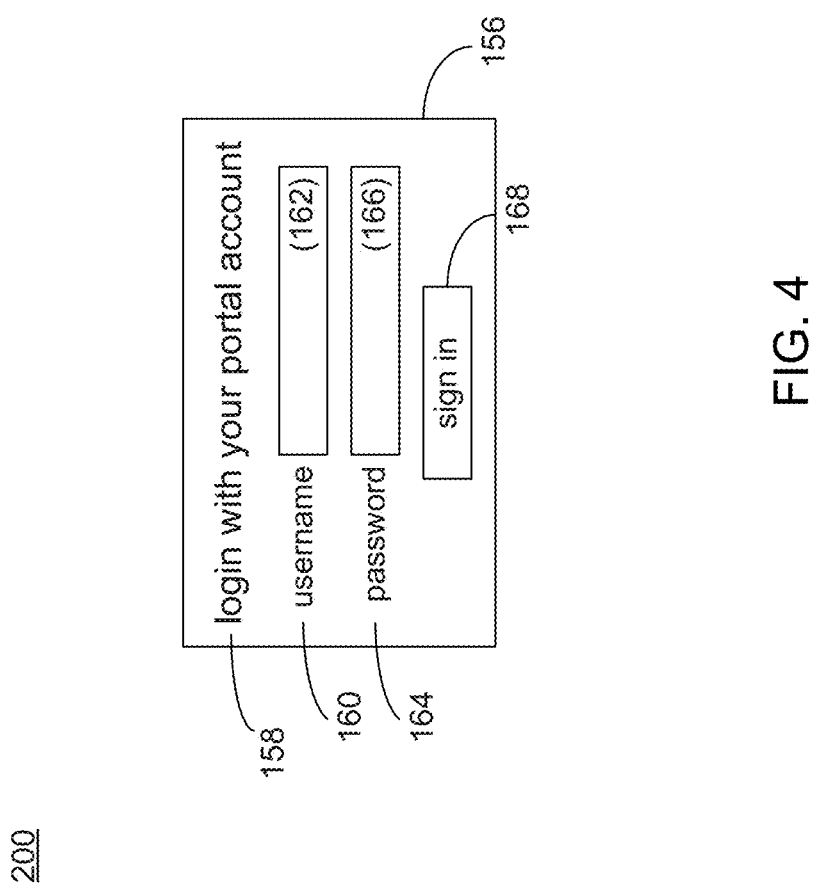
FIG. 4 is a diagrammatic representation of a user interface that may be provided, at least in part, by the screen capture process of FIG. 1, according to an implementation of the present disclosure.

Referring also to FIG. 4, when a tester and/or developer accesses the documentation record associated with login page object 156, he may see image 200 of isolated login page object 156 displayed. As such, when a tester accesses the documentation record associated with login page object 156, e.g., to write a test of the API at least partially embodied by login page object 156, the tester may be able to utilized image 200, to assess visual elements of the API.

As generally described above, screen capture process 10 may also enable maintaining page object images, e.g., such that images of page objects associated with a documentation record for the page object may remain up to date, for example, in the event of a change to the user interface. In an embodiment, associating 104 the screen capture image with the documentation record for the page object may include replacing 116 a prior screen capture image. For example, as described above, screen capture process 10 may associate the screen capture image with a documentation record associated with the page object such that a developer and/or tester may be able to see image 200 of the page object. In an embodiment, screen capture process 10 may evaluate whether the screen capture image is different than a currently stored screen capture image associated within a documentation record for the page object. In a situation in which the created 102 screen capture image is different from a current image associated within the documentation record (and/or no image is associated with the documentation record for the page object), screen capture process 10 may replace 116 a prior screen capture image. Replacing 116 the prior screen capture image may include, for example, overwriting the prior screen capture image with the newly created 102 screen capture image, and/or changing a reference (e.g., location identifier) for the image included within the documentation record with a reference corresponding to the newly created screen capture image.

While various example embodiments are described in the context of test framework application 56 including Selenium, similar implementations utilizing other test framework applications will be appreciated by those having skill in the art. Such additional/alternative implementations are considered to be included in the instant disclosure.

Figure 5:
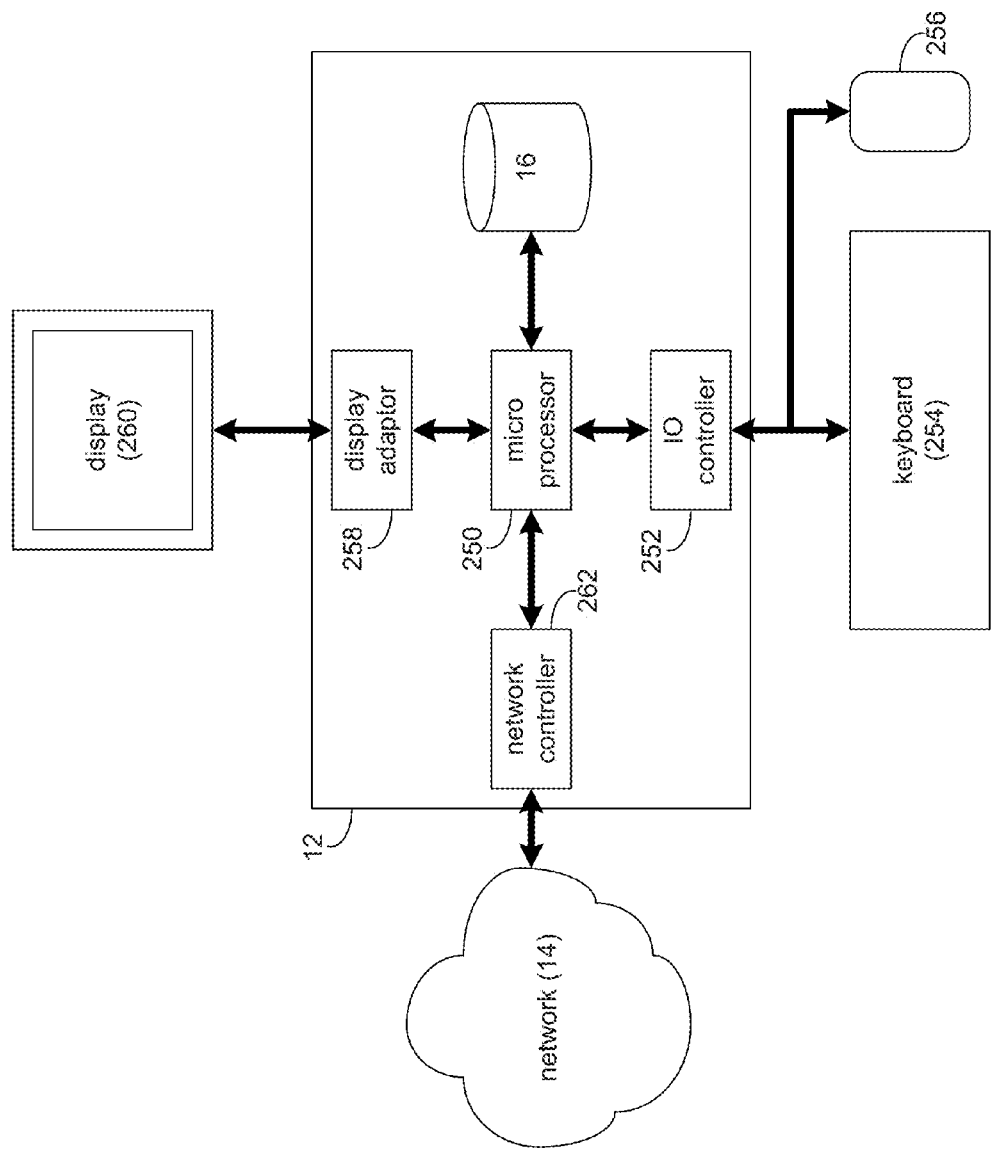
FIG. 5 is a diagrammatic view of the computing device of FIG. 1, according to an implementation of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, screen capture process 10 may be substituted for computing device 12 within FIG. 5, examples of which may include but are not limited to client electronic devices 28, 30, 32, 34.

Computing system 12 may include microprocessor 250 configured to e.g., process data and execute instructions/code for screen capture process 10. Microprocessor 250 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 252 may be configured to couple microprocessor 250 with various devices, such as keyboard 254, mouse 256, USB ports (not shown), and printer ports (not shown). Display adaptor 258 may be configured to couple display 260 (e.g., a CRT or LCD monitor) with microprocessor 250, while network adapter 262 (e.g., an Ethernet adapter) may be configured to couple microprocessor 250 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 250) of a general purpose computer/special purpose computer/other programmable data processing apparatus (e.g., computing device 12), such that the instructions, which execute via the processor (e.g., processor 250) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, by a computing device, a screen capture annotation for a page object, wherein the screen capture annotation is added to software code associated with the page object and indicates a request to automatically create a screen capture image of the page object;
   identifying, by the computing device, a portion of a user interface display associated with the page object, including examining the page object, including calculating a parent element in a document object model associated with the page object, wherein the parent element is a lowest identified parent element of one or more defined elements of the page object;
   identifying, by the computing device, the screen capture annotation within software code associated with the page object;
   for each page object associated with the identified screen capture annotation, automatically creating the screen capture image including the portion of the user interface display associated with the page object upon identifying the screen capture annotation within the software code associated with the page object; and
   associating, by the computing device, the screen capture image with a documentation record for the page object, wherein associating the screen capture image with a documentation record for the page object includes displaying the screen capture image and at least a portion of the software code associated with the page object when accessing the documentation record for the page object.

2. The computer-implemented method of claim 1, wherein identifying the portion of the user interface display associated with the page object includes identifying an explicitly defined parent element in a document object model associated with the page object.

3. The computer-implemented method of claim 1, further comprising cropping the screen capture image to isolate the page object.

4. The computer-implemented method of claim 3, wherein cropping the screen capture image comprises extracting a user interface screen location associated with the page object.

5. The computer-implemented method of claim 1, wherein associating the screen capture image with the documentation record for the page object includes replacing a prior screen capture image.

\* \* \* \* \*